Jan. 27, 1970   C. W. MORRIS ET AL   3,491,587
VEHICLE DYNAMIC TESTING RIG
Filed Sept. 25, 1967   4 Sheets-Sheet 1
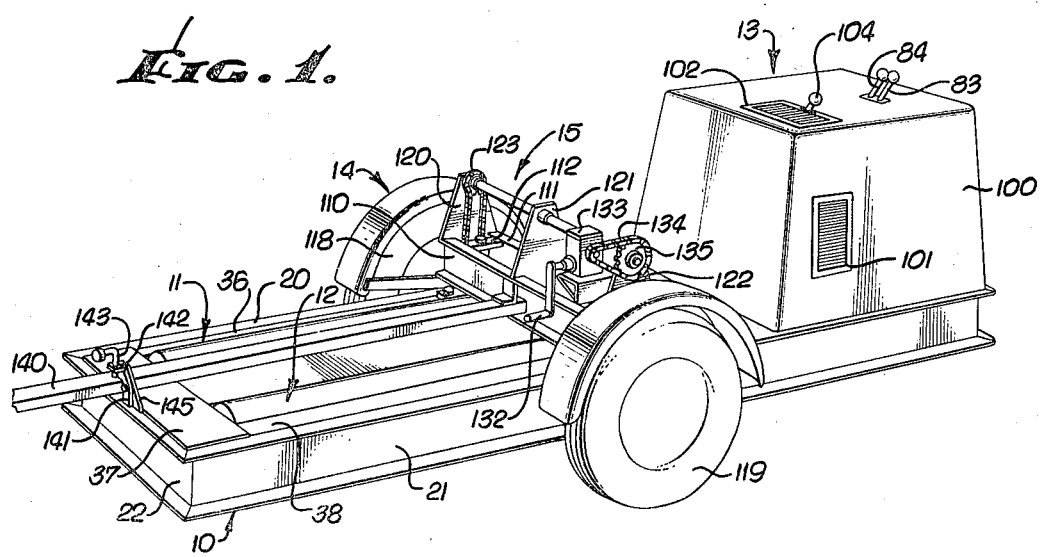
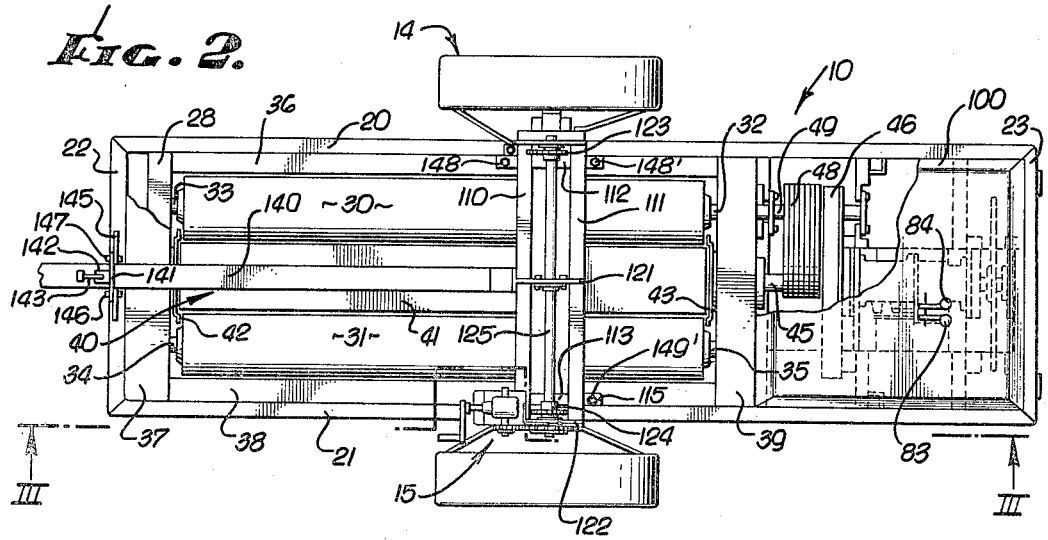
CHARLES W. MORRIS
JOHN R. ULYATE
   INVENTORS.
By
Mikotta, Glenny, Poms & Smith
   ATTORNEYS.

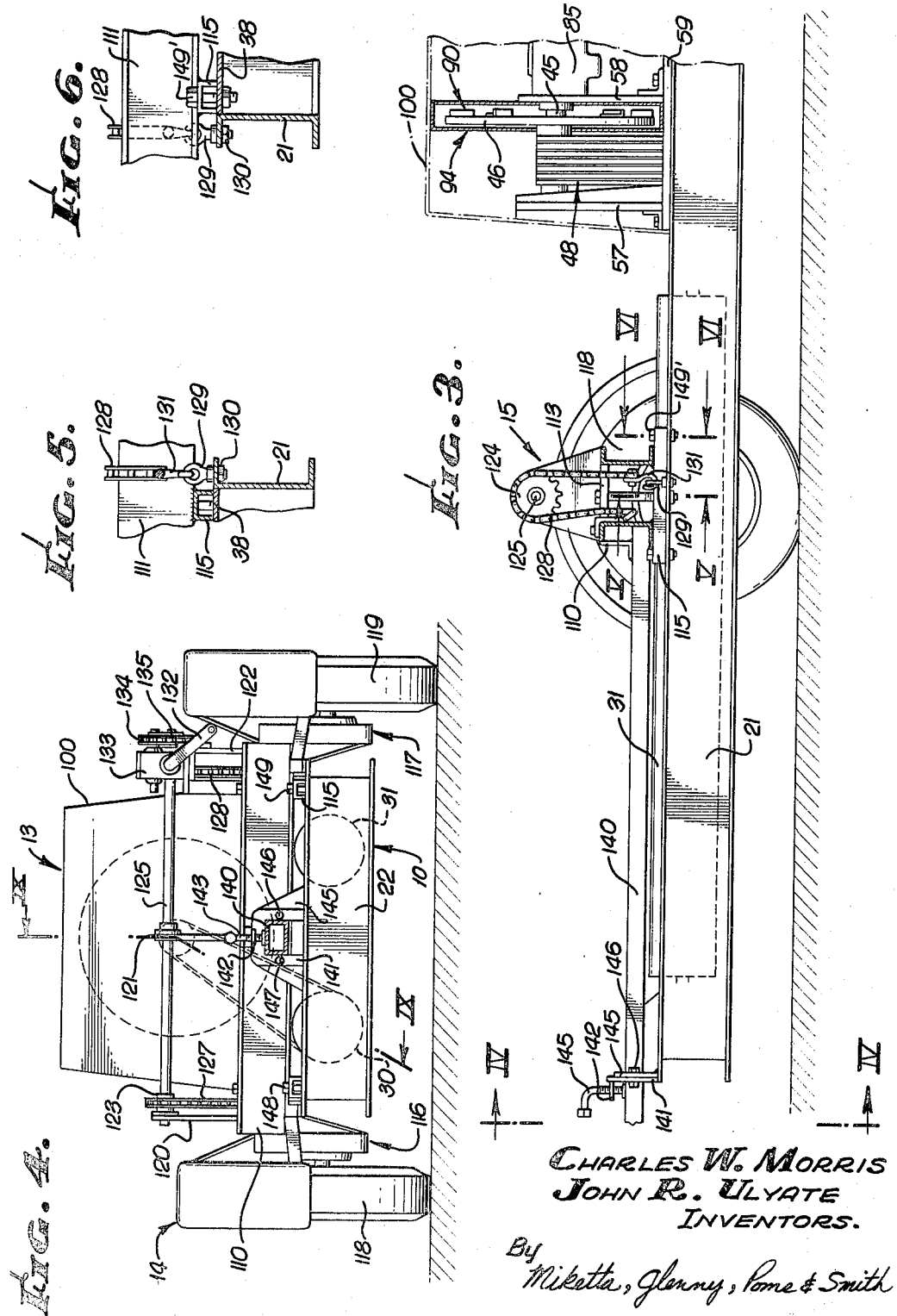

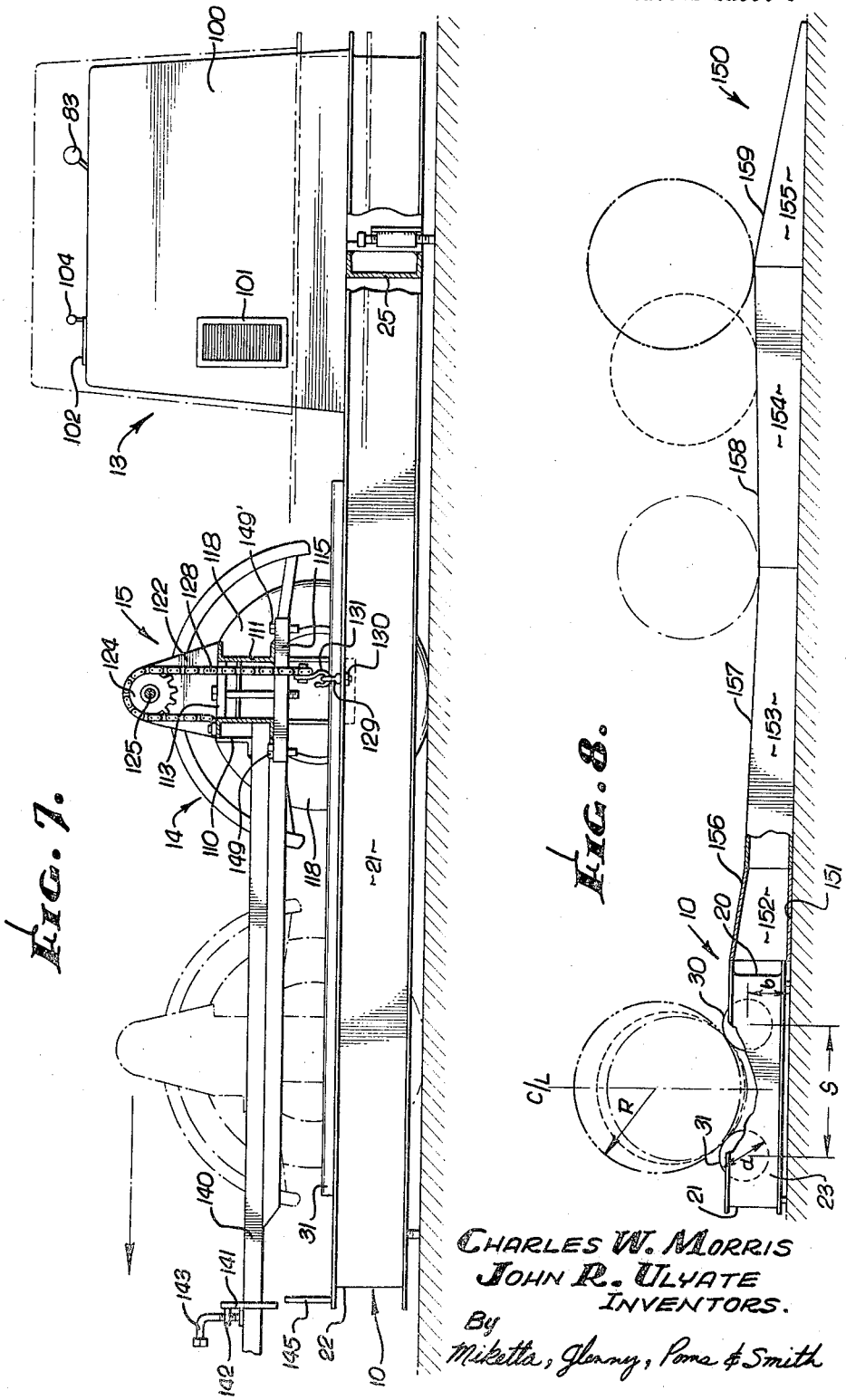

CHARLES W. MORRIS
JOHN R. ULYATE
INVENTORS.

BY
Miketta, Glenny, Poms & Smith
ATTORNEYS.

3,491,587
VEHICLE DYNAMIC TESTING RIG
Charles W. Morris, Los Angeles, and John R. Ulyate, Torrance, Calif., assignors, by direct and mesne assignments, to Chromalloy American Corporation, West Nyack, N.Y., a corporation of New York
Filed Sept. 25, 1967, Ser. No. 670,067
Int. Cl. G01m 15/00; G01l 3/18
U.S. Cl. 73—117                                      11 Claims

ABSTRACT OF THE DISCLOSURE

A vehicle dynamic testing rig including a main frame, spaced roll means and roll mounting means for mounting the roll means to the main frame for receiving and cradling thereon the driven wheels of a motor vehicle to be tested wherein a power absorption unit is mounted upon the frame which includes at least one inertia wheel and a transmission means connected between the roll means and the inertia wheel for selectably connecting and producing two or more speed ratios between the rates of rotation of the inertia wheel and the roll means. A second inertia wheel fixed on a drive shaft to be driven by the roll means with the drive shaft connected to the aforementioned transmission means and which includes a gear box and associated gear shifting means for selectively connecting and disconnecting the associated first inertia wheel in addition to the second inertia wheel. Laterally extending vanes mounted about an inertia wheel connected to roll means for testing a vehicle to absorb power from the vehicle being tested by means of driving air adjacent the inertia wheel. Scroll-like casing means about the inertia wheel provided with vane means and associated damper valve means for selectably controlling the amount of air being circulated through the casing and the amount of power being thus absorbed from the vehicle driven wheels due to movement of air by vane means through the scroll means. At least three connector means at three spaced locations on the testing rig main frame and an auxiliary frame with a pair of spaced vehicle wheels rotatably mounted thereon and a hoist means on the auxiliary frame for hoisting the main frame up under the auxiliary frame by two of the frame connector means, the third frame connector means being releasably secured to a tongue member extending outwardly of the auxiliary frame. A ramp means having ramp top surfaces extending generally from the level of the top surface of the test rig to ground level with a portion thereof between about seven feet and about eleven feet from the center line of the roll means having a height which varies above ground level in accordance with the relationship.

$$h = \sqrt{\left(R + \frac{d}{2}\right)^2 - \left(\frac{S}{2}\right)^2} + b - R$$

wherein $h$ equals the height of the ramp portion top surface above ground level, $R$ equals the vehicle driven wheels rolling radius, $d$ equals the diameter of the rolls of the roll means, $S$ equals the spacing of the axes of the rolls, and $b$ equals the height of the roll axes above ground level.

BACKGROUND OF THE INVENTION

This invention relates generally to vehicle dynamometer or dynamic testing devices and particularly to such a testing rig which is portable between locations of use and which employs a novel absorption unit and associated ramp means in testing vehicles for their performance characteristics, simulating engine loading conditions when driving over the highways.

In conducting tests on motor vehicles, it is often desirable to maintain the vehicle stationary while conducting power operation of the engine. This is normally done by mounting the vehicle chassis on a set of rolls connected to a power absorbing and measuring device, normally termed a chassis dynamometer. Such dynamometers in the prior art have employed brake means and other methods of absorbing energy from the vehicle driven wheels including the use of a single inertia wheel. Each vehicle of different weight requires the selection and connection of the proper amount of inertia mass in the dynamometer correlated to the vehicle weight.

In order to simulate the drag effect of a car passing through atmospheric air while driving at high speed on the road, it has been the practice in the past to establish a slight load in the power absorption unit by braking means provided in a dynamometer. A fixed braking setting results in a roll drag load which increases or decreases as the cube of the roll speed and thus produces a "wind effect" typical of varying car speed. However, these braking units heretofore employed require a supply of water for heat dissipation and a means of handling the water and disposal thereof.

It is the primary object of this invention to provide a portable testing rig particularly suited for use in the testing of motor vehicle emission control devices where there is a need for periodically and routinely testing each car in a manner typical of the weight and power requirements of that vehicle to determine that the emission control equipment is working properly. In order to meet the requirements of such testing, the dynamic testing rig must be portable between different locations of use, it must be quickly made ready for use at any given location and it must be adjustable in a matter of seconds to privde the proper testing power absorption characteristics to match the testing needs for various different size vehicles expected in a random testing of emission control equipment in vehicles, as perhaps would occur in vehicles passing a more or less impromptu testing station on the highway.

It is therefore an object of the present invention to disclose and provide a dynamic testing rig capable of matching a plurality of different weights of vehicles during testing on a dynamometer through the use of just two inertia wheels. It is another object of the present invention to disclose and provide a testing rig as in the foregoing object wherein at least one of the inertia wheels is connected to the roll means of the dynamometer unit through a transmission means including a multiple gear box or transmission to achieve inertia weight effects equivalent to four or more different weights of vehicles through use of only one or two inertia wheels.

It is another object of this invention to disclose and provide a means for simulating windage loading on vehicles to be tested without the need for use of water cooling or other extraneously applied means to the testing rig or unit. It is also an object of the present invention to disclose and provide means for varying the power absorption characteristics of the windage loading simulating device.

It is another object of this invention to disclose and provide a means for making the dynamic testing rig readily portable and to provide and disclose ramp means of such proportions and configurations that vehicles of different lengths and wheel diameters will assume a substantially horizontal position during testing when the driven wheels are positioned between the relatively fixed rolls of the dynamometer roll means.

It is another object of the present invention to disclose and provide an easily portable dynamic testing rig which may be relocated from one test location to another without requiring connections to utilities for its operation, particularly the need for water supply for cooling and a means for disposal of the excess water, reducing testing costs per vehicle tested.

SUMMARY OF THE INVENTION

Generally stated, the vehicle dynamic testing rig according to the present invention comprises the provision of a power absorption unit mounted upon a main frame of a testing rig which includes at least one inertia wheel and wherein a transmission means is connected between the roll means of the testing rig and the power absorption unit for selectably connecting the roll means to the inertia wheel for producing two or more speed ratios between the rates of rotation of the inertia wheel and the roll means simulating two or more vehicle masses driven by the driven wheels of the motor vehicle being tested through the use of a single inertia wheel. More particularly, the invention includes the provision of a second inertia wheel fixed on a drive shaft to be driven by a torque transmitting means transmitting torque from the roll means directly to the drive shaft, the second inertia wheel always being connected to the drive wheels and simulating a single vehicle mass to be driven by the driven wheels of the vehicle being tested, and wherein a transmission means including a gear box and associated gear shifting means is connected between the main drive shaft and the formerly mentioned first inertia wheel for selectively connecting and disconnecting the first inertia wheel of the power absorption unit to the drive shaft and thereby selectably simulating a plurality of vehicle masses to be driven by the vehicle being tested without the need for removal or replacement of inertia wheels but through the relatively simple and familiar process of shifting the transmission means gear box from neutral through the associated number of gears.

The vehicle dynamic testing rig of the present invention also includes the provision of a plurality of laterally extending vanes mounted about and generally adjacent the periphery of either or both of the inertia wheels employed in the power absorption unit for driving air adjacent thereto and thereby absorbing power from the vehicle being tested in simulation of the windage effects upon a vehicle as it is driven over the highways. In conjunction with the use of such vane means, a scroll-like casing means is preferably provided about the inertia wheel employing such vane means with a damper valve means provided in association with the casing means for selectively controlling the amount of air being circulated through the casing and thus the amount of power being absorbed from the vehicle driven means simulating the windage effect upon the vehicle at different speeds as though it were being driven over the highway.

The vehicle dynamic testing rig of the present invention is also portable to facilitate movement between various areas of testing, particularly as required in testing of vehicles at random locations on the highways for their compliance with vehicle exhaust emissions standards adopted or to be adopted by the various state authorities. Generally stated, the portable rig includes the provision of at least three connector means at three spaced locations on the vehicle testing rig main frame, an auxiliary frame with a pair of spaced vehicle wheels rotatably mounted thereon, a hoist means on the auxiliary frame for hoisting the main frame member up under the auxiliary frame by two of the frame connectors and a tongue member extending outwardly of the auxiliary frame which is provided with fastening means on an outer extremity thereof for releasably securing a third connector means provided on the frame.

Ramp means are adapted for use with the vehicle dynamic testing rig within the present invention to position the front wheels of a vehicle being tested at a predetermined height above ground level to maintain the vehicle in a generally horizontal disposition relative to the testing rig. It has been found that the vehicle being tested is maintained in such generally horizontal disposition, whether it is a small foreign manufactured vehicle with a short wheel base and small wheels or a large domestic vehicle with a long wheel base and large wheels where at least one portion of the ramp means at between about seven and eleven feet from the center line of the roll means of the testing rig is provided with a top surface having a height above ground level on which the test rig is located which varies in accordance with the relationship $$h = \sqrt{\left(R+\frac{d}{2}\right)^2 - \left(\frac{S}{2}\right)^2} + b - R$$

wherein $h$ equals the height of the ramp portion top surface above ground level; $R$ equals the vehicle driven wheels rolling radius; $d$ equals the diameter of the rolls of the roll means; $S$ equals the spacing of the axes of the roll; and $b$ equals the height of the roll axes above ground level.

Further advantages and objects of the present invention will become apparent to those skilled in the art from a consideration of the following detailed explanation and description of a preferred exemplary embodiment of portable vehicle dynamic testing rig according to the present invention. Reference will be made to the appended sheets of drawings wherein:

FIG. 1 is a perspective view of a preferred exemplary embodiment of vehicle dynamic testing rig according to the present invention for use in dynamic testing of motor vehicles;

FIG. 2 is a plan view, partially in section, of the exemplary embodiment of vehicle dynamic testing rig of FIG. 1;

FIG. 3 is a side elevational view, partially in section, of the preferred exemplary embodiment of dynamic testing rig of FIGS. 1 and 2 taken along the plane III—III in FIG. 2;

FIG. 4 is a front elevational view of the preferred exemplary embodiment of testing rig of FIGS. 1 through 3 taken along the plane IV—IV in FIG. 3;

FIG. 5 is a detail view of a portion of the exemplary testing rig of FIG. 3 taken therein along the plane V—V;

FIG. 6 is a detail view of a portion of the exemplary testing rig of FIG. 3 taken therein along the plane VI—VI;

FIG. 7 is a side elevational view, partially in section, of the exemplary testing rig of FIG. 3 showing the testing rig main frame lowered to ground level beneath the testing auxiliary frame and trailer means;

FIG. 8 is a side elevational view of a preferred exemplary embodiment of ramp means for use in cooperation with the exemplary embodiment of testing rig according to the present invention;

Figure 9:
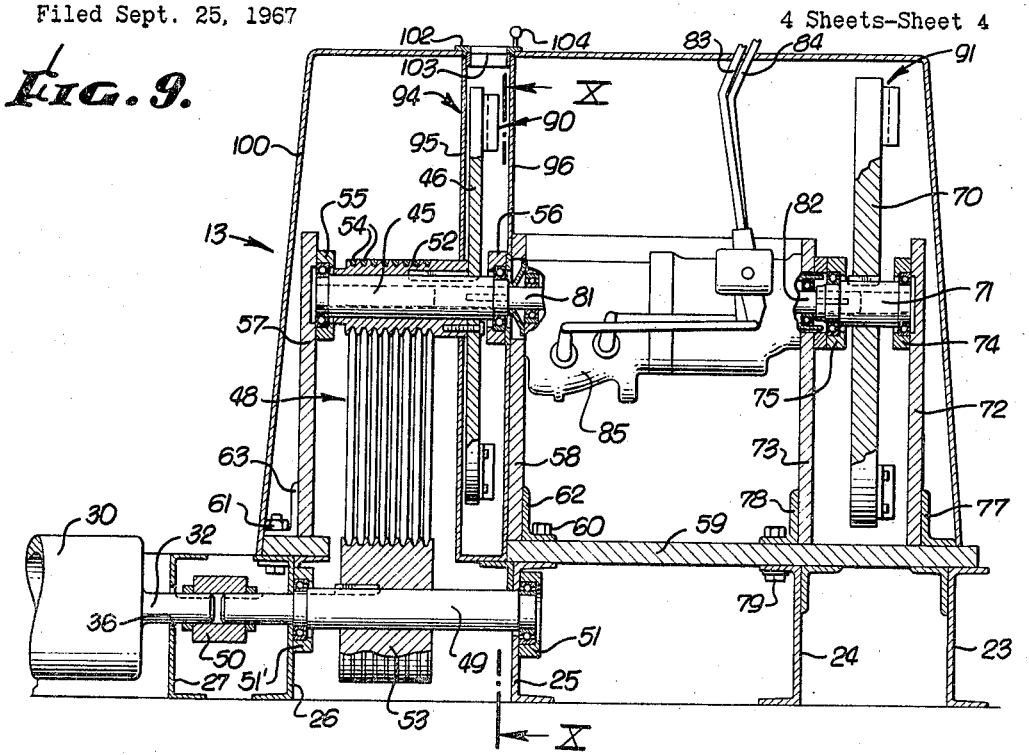
FIG. 9 is a section through the power absorption unit of the exemplary embodiment of vehicle dynamic testing rig of FIG. 4 taken therein along the plane IX—IX.

A detailed description of a preferred exemplary embodiment will now be made. Referring first to FIG. 1, the preferred exemplary embodiment of vehicle dynamic testing rig according to the present invention includes generally: a main frame, indicated generally at 10; spaced roll means, indicated generally at 11 and 12 respectively; a power absorption unit, indicated generally at 13, which is connected to the roll means by transmission means, as seen in FIG. 9; and cooperating trailer means, indicated generally at 14, which includes an associated hoisting means, indicated generally at 15, for transporting the main frame and its aforementioned associated parts. As best seen in FIG. 7, the testing rig main frame and its associated roll means and power absorption unit may be lowered to or raised from ground level by operation of the hoist means, indicated generally at 15, on the auxiliary frame and trailer means, indicated generally at 14 as will be hereinafter explained in detail.

The testing rig main frame, as seen in FIGS. 1 through 4 and 9, includes a pair of longitudinally extending side channels 20 and 21 and transversely extending end channels 22 and 23 forming a generally rectangular frame. The channels 20 through 23 may be made of structural steel members and are welded together into the rectangular configuration illustrated. Additional transverse or cross frame members or channels 24, 25, 26 and 27 may be provided, as best seen in FIG. 9, beneath the power absorption unit, indicated generally at 13, to provide the requisite frame rigidity beneath the power absorption unit as well as to provide frame members for the mounting of bearing means for the various rotating shafts as hereinafter explained with regard to the exemplary roll means and torque transmitting means employed. A channel 28 may also be provided at the forward end of the frame, as seen in FIG. 2, for use in mounting the forward ends of the roll means, indicated generally at 11 and 12.

Roll means and means for mounting the roll means to the main frame, indicated generally at 10, are provided for receiving and cradling the driven wheels of a motor vehicle thereon during testing of the vehicle. As seen in FIGS. 2 and 9, such spaced roll means, in the exemplary embodiment, include the provision of a pair of individually mounted rolls 30 and 31. Rolls 30 and 31 may be made in conventional manner of steel or suitable aluminum alloy pipe. The rolls are mounted by end spindles or mandrels 32, 33, 34 and 35 which protrude through journals or apertures provided in the main frame cross member channels 27 and 28, as spindle or mandrel 32 of roll 30 is received into the aperture 36 in channel 27 as seen in FIG. 9. The spindles or mandrels 32, 33, 34, and 35 may be secured at the ends of rolls 30 and 31 in any conventional manner, as by welding.

As best seen in FIGS. 1 and 2, the main frame, indicated generally at 10, is also provided with heavy sheet metal flanges 36, 37, 38 and 39 extending inwardly of the frame channels 20, 22 and 21 and overlying frame channels 26 and 27, respectively. Such additional metal flanges facilitate the driving of a vehicle onto and off of the roll means provided in the testing rig. It is contemplated that the additional flanges 36, 37 and 38 could be formed integrally with the main frame channels 20, 22 and 21, respectively.

In addition to the aforementioned conventional roll means provided on the main frame of the testing rig, conventional hydraulically operated roll braking or holding means and vehicle wheel lifting means may be provided. Part of a conventional wheel lifting means is illustrated at 40 in FIG. 2, including the provision of a plate 41 which is mounted for vertical movement relative to the main frame between guides 42 and 43. Such lifting plate 41 may be operated by conventional hydraulically operated means in known manner for raising the driven wheels of a vehicle tested on the roll means to facilitate driving the vehicle off of the testing rig. Also, as is well known in the art, hydraulically operated brake shoe means may be employed in conjunction with such raising plate 41 to push against the underside of rolls 30 and 31 to hold them stationary when plate 41 is raised by the commonly associated hydraulically operated ram means.

As particularly contemplated within the present invention, the aforedescribed main frame and its associated conventional roll means are provided with a novel power absorption unit and cooperating trailer and hoisting means for transporting the testing rig between testing locations. The exemplary embodiment of power absorption unit and its associated transmission means will be described first with reference particularly to FIGS. 2, 9 and 10.

In testing a motor driven vehicle on the dynamic testing rig, according to the present invention, the driven roll 30 is positioned under the forward portions of the vehicle driven wheels. As the vehicle engine is accelerated and the driven wheels speed of rotation increases, the power thereof is absorbed by the power absorption unit. The exemplary embodiment of power absorption unit is indicated generally at 13 and is connected to the power absorbing roll 30, while the other spaced roll 31 revolves merely as an idler supporting the vehicle wheels.

As best seen in FIG. 9, a main drive shaft 45 is provided as part of the power absorption unit, indicated generally at 13. An inertia wheel 46 is fixedly mounted to such main drive shaft 45 to be rotated therewith. Inertia wheel 46 preferably has a mass of approximately 150 pounds in order that its inertia approximates (together with that of the roll means and associated pulleys hereinafter described as part of the transmission means) that of a fifteen hundred pound vehicle.

Torque transmitting means are provided for transmitting the torque applied by the vehicle driven wheels on the roll means, including the power absorption roll 30, to the main drive shaft 45 and its associated inertia wheel. As seen in FIGS. 2 and 9, such torque transmitting means in the exemplary embodiment includes the provision of a belt drive, indicated generally at 48 between main shaft 45 and a shaft 49 coupled by coupling means 50 to the spindle or mandrel 32 of roll 30. Shaft 49 is journaled rotatably on main frame cross channels 25 and 26 by means of conventional ball bearings 51 and 51', respectively, as seen in FIG. 9. The belt drive means, indicated generally at 48, forming a portion of the torque transmitting means includes the provision of a belt pulley 52 on main shaft 45, a belt pulley 53 on shaft 49 and the plurality of belts 54 joining the pulleys 52 and 53. The torque applied to roll 30 is thus transmitted through shaft 49, pulley 53, belts 54 and pulley 52 to the main shaft 45.

Main shaft 45 is mounted in the power absorption unit, indicated generally at 13, by ball bearing means 55 and 56 secured to the standards 57 and 58, respectively. The standards are seated on the floor panel 59 and bolted to the rig main frame cross channel members 23, 24, 25 and 26. Bolts 60 and 61 may be employed to secure angle irons or upstanding flanges 62 and 63, respectively, to the unit panel 59 as well as secure panel 59 to the cross members 25 and 26 therebelow. Standards 57 and 58 may be secured to the angle irons 63 and 62, respectively, by welding or by other suitable fastening means.

As also particularly contemplated within the present invention, a single additional inertia wheel 70 is rotatably mounted by its shaft 71 within the power absorption unit and is selectively connected or disconnected to the unit main shaft 45 by means of a transmission means indicated generally at 80. Second inertia wheel 70 is preferably larger in mass than the first inertia wheel 46, preferably having a mass of approximately two hundred pounds. Inertia wheel 70, as best seen in FIG. 9, is rotatably mounted by shaft 71 to a pair of upstanding standards 72 and 73 by means of the ball bearing means 74 and 75, respectively. Bearing means 75 is secured to standard 73 by means of an intermediate plate 76 in order that an output shaft of the transmission means, indicated generally at 80, may be rotatably mounted in standard 73 to rotate shaft 71 to which it is coupled. Standards 72 and 73 may be secured to the unit floor panel 59 by means of welding to angle irons 77 and 78, respectively, which in turn may be bolted to the main frame channels through the floor panel 59, as for example by bolt means 79 as seen in FIG. 9.

Transmission means are provided for connecting or disconnecting the roll means, particularly roll 30, to the inertia wheel 70 and for selectively connecting the same for producing two or more speed ratios between the rates of rotation of inertia wheel 70 and roll 30. In the exemplary embodiment, such transmission means, indicated generally at 80, includes the provision of a four speed automobile type transmission with a conventional gear box and manually operated overdrive means.

As seen in FIG. 9, the input shaft 81 of the transmission means is connected to the power absorption unit main shaft 45, which may be considered as part of the torque transmitting means for transmitting torque from roll 30 to inertia wheel 70 through the transmission means.

The output shaft 82 of the transmission means, also as seen in FIG. 9, is connected into the shaft 71 of inertia wheel 70. Any one of four gear ratios may be chosen through the manipulation of gear selector lever 83 to produce three different speed ratios between the rates of rotation of inertia wheel 70 and roll means 30. In addition, the manual overdrive lever 84 may be operated to obtain additional speed ratios.

Inertia wheel 70 may be disconnected from the main shaft 45 by positioning gear selector lever 83 in a neutral position. In such instance, in the exemplary embodiment, the mass of inertia wheel 70 would be disconnected from the roll means and only the former inertia wheel 46 would be operated through rotation of roll 30.

Gear box 85 of the transmission means, indicated generally at 80, may be provided with other than the number of internal gears required for a conventional four speed transmission. A two speed, three speed or as many as ten forward speeds may be provided by use of the suitable gear box and associated internal gears. We have found that in testing motor vehicles for their compliance with air pollution control standards, that the use of the two inertial wheels 46 and 70 together with the three speed and overdrive transmission means, indicated generally at 80, of the exemplary embodiment, allows the operator of the exemplary rig to optionally choose an inertia effect which will simulate the mass of a 1500 (by first inertia wheel 46) and, 2000, 2500, 3000, 4000, or 5000 pound vehicle (by the transmission and gear box) when driven on the highway. Further, the provision of vane means, as hereinafter described provides additional power absorption in proportion to the higher wind resistance which would be met when a vehicle is traveling at higher speeds by responding to the higher velocities or speed of the vehicle wheels on the test rig.

Figure 10:
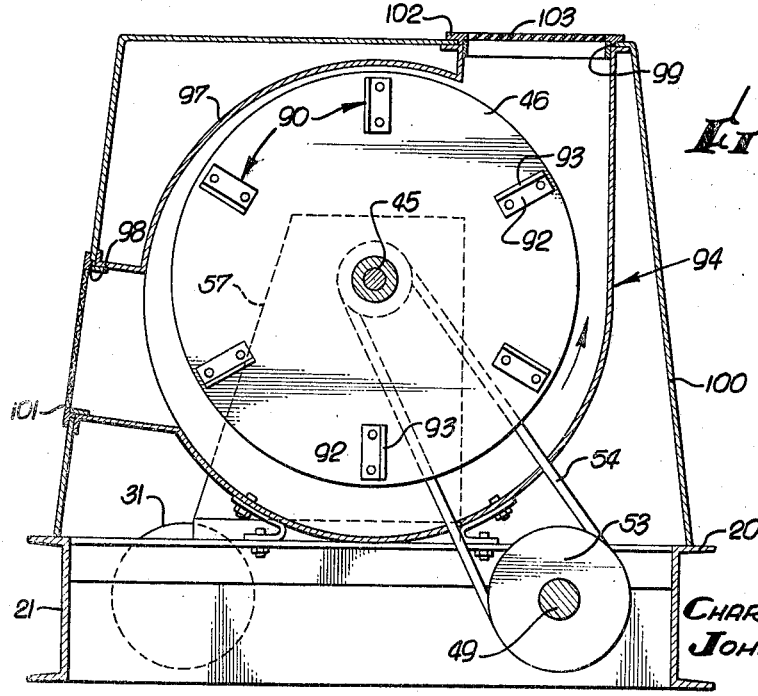
FIG. 10 is a vertical section view of the testing rig power absorption unit of FIG. 9 taken therein along the plane X—X.

Vane means may be provided on either or both of the inertia wheels provided within the exemplary power absorption unit in order to absorb additional energy in proportion to that expended by a vehicle encountering increased wind resistance at increased highway speeds. In the exemplary embodiment, such vane means are indicated generally at 90 on inertia wheel 46 and at 91 on inertia wheel 70. Such exemplary vane means include a plurality of plates, flanges or vanes, as plate 92 with vane 93 in FIG. 10, bolted, riveted or otherwise secured to the associated inertia wheel with the upstanding flange or vane portion thereof laterally protruding from the inertia wheel side surface, as seen in FIGS. 9 and 10. The laterally protruding flange portions or vanes, as vane 93 in FIG. 10, may also be curved to reduce fan noise and positioned at an angle to planes intersecting the center of rotation of the wheel. Also, the plurality of vanes are provided on each inertia wheel about and generally toward the wheel periphery for obtaining the highest possible velocity of rotation for such vanes during inertia wheel rotation. The plurality of vanes provided thus propel the air adjacent to the inertia wheel as the wheel is rotated in response to driving of the power absorption roll 30 by the driven wheels of the motor vehicle being tested.

In order to provide for selectively varying the amount of power absorbed by the aforementioned vane means for any given speed of rotation for the associated inertia wheel, a scroll-like casing means may be provided about the inertia wheel and damper valve means may be provided for controlling air flow through the scroll means. Such scroll and damper valve means may be employed with either or both of the inertia wheels. In the exemplary embodiment of the power absorption unit, a single scroll-like casing means is illustrated in association with the inertia wheel 46. The exemplary scroll-like casing means indicated generally at 94 and as best seen in FIGS. 9 and 10, may include front and rear sheet metal walls 95 and 96 with the surrounding arcuate outer wall 97. The scroll means has inlet 98 and outlet 99, inertia wheel 46 being driven in a counter-clockwise direction when viewed in FIG. 10.

The power absorption unit housing 100 is also provided with an inlet and outlet mating with the scroll means inlet 98 and outlet 99 as seen in FIG. 10. Preferably, the housing is provided with an inlet grill or grating 101 and an outlet grill or grating 102. Damper valve means may be provided in association with the scroll-like casing means and housing 100 by providing means for mounting the vanes 103 of grill 102 for movement between opened and closed positions by manipulation of lever 104. The power absorption characteristics of the rotating vane means may be varied by selective adjustment of lever 104 varying the volume of air flow through grill 102 from a minimum to maximum amount. The greatest energy absorption by the vane means is accomplished when the damper valve means or outlet vanes 103 are fully opened.

As also contemplated within the present invention, the vehicle dynamic testing rig is portable so that the rig may be easily transported between different locations of use. Referring particularly to FIGS. 1 through 7, the portable testing rig, according to the present invention, includes the provision of a trailer means, indicated generally at 14 and a hoist means, indicated generally at 15, associated therewith for hoisting the rig main frame, indacted generally at 10, up under an auxiliary frame of the trailer means.

The trailer means, indicated generally at 14, in the exemplary embodiment includes the provision of a trailer or auxiliary frame comprising two spaced channel members 110 and 111 interconnected by upper angle iron cross members 112 and 113 and lower angle iron cross members 114 and 115, respectively. As best seen in FIG. 4, at either end of the auxiliary or trailer frame, independent wheel suspension means are provided, as indicated generally at 116 and 117, respectively, for mounting wheels 118 and 119 to the trailer or auxiliary frame.

Hoist means are provided on the auxiliary frame of the trailer means for hoisting the rig main frame, indicated generally at 10, up under the auxiliary frame channel members 110 and 111 to which the main frame is then bolted during transportation. In the exemplary embodiment, such hoist means include the provision of three support flanges or standards 120, 121 and 122 upon the auxiliary frame channel members 110 and 111, as best seen in FIGS. 1, 2 and 4. A pair of sprocket wheels 123 and 124 are mounted on a shaft 126 journaled in the spaced standards 120, 121 and 122. Chains 127 and 128 are fitted over the sprocket wheels 123 and 124. The lower end of each chain 127 and 128 is provided with a hook means for hooking onto a connector means secured to the rig main frame side channels 20 and 21. As seen in FIGS. 3, 5 and 6, such connecting means on the main frame may include eye-bolts secured to the frame channel members, as eye-bolt 129 is bolted to channel member 21 by means of nut 130 as seen in FIG. 5. The hook means provided at the bottom of each chain 127 and 128 may be easily inserted into the eye of the eye-bolt, as hook 131 is inserted into eye-bolt 129 in FIG. 5, for raising of the mid-portion of the testing rig up under the trailer frame by operation of the hoist means manually operated crank 132. Crank 132 is connected to the hoist means shaft 125 through a gear reduction box 133 and the associated chain drive 134 driving a sprocket wheel 135 mounted at the outer end of shaft 125.

A tongue member 140 is provided on the trailer means, indicated generally at 14, for use in connecting the trailer to a vehicle for hauling the test rig. Tongue member 140 extends outwardly of the auxiliary frame channel member 110, to which it may be welded, and is provided with a fastening means on its outer extremity for releasably securing a third connector means on the rig main frame thereto. Such fastening means includes the provision of a generally inverted U-shaped plate 141 fitted over the rectangular tongue 140 with a flange 142 parallel to the top surface of tongue 140, as best seen in FIG. 3. Flange 142 is tapped and internally threaded to receive a bolt 143 which may be turned down on the top surface of tongue 140 to hold the plate 141 in any selected location thereon. The third connector means provided in the exemplary embodiment on the main frame includes the provision of an upstanding plate or flange 145 on the cross member 22 of the main frame. Plate 145 has an upwardly opening slot to receive the tongue 140 therein. The plates 141 and 145 may then be bolted together in conventional manner by bolts 146 and 147.

During transporting of the portable rig over the highways between testing locations, the main frame channels 20 and 21 are preferably bolted to the trailer or auxiliary frame channels 110 and 111. As seen in FIGS. 3, 4 and 6, conventional bolt means may be employed, as bolts 148, 148', 149 and 149'. The portable testing rig, according to the present invention, is shown in its assembled relationship for transportation in FIG. 3. From the foregoing description, it can be seen that when the portable rig is transported to a location of use, the aforedescribed bolt means, 146 through 149, may be unfastened and the rig main frame, indicated generally at 10, may be lowered by the hoist means, indicated generally at 15, to a ground level as illustrated in FIG. 7. Leveling or height adjustment means may be provided for positioning the main frame of the testing rig in a horizontal position even though the particular ground surface thereunder is not exactly level.

As further contemplated within the present invention, the vehicle dynamic testing rig is provided with ramp means for not only facilitating the driving of a motor vehicle onto or off of the rig but for maintaining such vehicles in a generally horizontal disposition when on said rig even though the wheel base dimensions and wheel diameters of the vehicles vary. Referring to FIG. 8, an exemplary embodiment of ramp means, according to the present invention, is shown at 150. Such ramp means may have a top surface width greater than the expected axial spacing of vehicle wheels to be driven thereon, or preferably, as in conventional ramp means, comprise two spaced longitudinally extending ramps. As seen in FIG. 8, the testing rig main frame, indicated generally at 10, is located on and level on a ground surface 151 with the power absorption roller 30 positioned to be placed under the forward portions of a vehicle driven wheel cradled thereon. In the exemplary embodiment of ramp means, such ramp means includes four ramp portions 152, 153, 154 and 155. Each portion may be made as a unit for assembly to the other units at a location of use.

The first ramp portion 152 adjacent the rig main frame, indicated generally at 10, is provided with a top surface 156 extending laterally of and inclined downwardly from the top surface of the main frame. The second ramp portion 153 adjacent to ramp portion 152 is provided with a top surface 157 which is either level or preferably slightly inclined from its end adjacent ramp portion 152 to its opposite lower end adjacent the third ramp portion 154. The third ramp portion 154 is constructed in a particular manner as hereinafter explained, but in general, has a top surface 158 which is inclined upwardly from the end adjacent ramp portion 153 to the opposite higher end adjacent the fourth ramp portion 155. As seen in FIG. 8, the fourth ramp portion 155 has a top surface 159 which preferably is inclined downwardly from the third ramp portion 154 to approximately ground level.

In order to accommodate different size vehicles having different wheel base lengths and different size tire rolling diameters, it has been found that the third ramp portion 154 should begin at a point approximately seven feet from a vertical center line between the rolls 30 and 31 and extend to a point approximately eleven feet from such vertical center line between rolls 30 and 31 with the top surface 158 having a height above ground level in accordance with the relationship:

$$h = \sqrt{\left(R+\frac{d}{2}\right)^2 - \left(\frac{S}{2}\right)^2} + b - R$$

wherein $h$ equals the height of the ramp means top surface above ground level, $R$ equals the vehicle tire or driven wheel rolling radius, $d$ equals the diameter of each of the rolls 30 and 31, $S$ equals the spacing of the axes of rolls 30 and 31 on the rig main frame and $b$ equals the height of the roll axes above ground level.

For example, where the rolls 30 and 31 have diameters of 8.6 inches, have an axis spacing of 20 inches, are mounted with their centers 5 inches above ground level and a small vehicle with a tire rolling radius of 11.1 inches is placed thereon, the ramp means top surface at about 7 feet from the roll means center line (the approximate location of the front wheels of a vehicle having such a tire rolling radius) should be approximately:

$$h = \sqrt{(11.1+4.3)^2} + 5 = 11.1 = 5.68 \text{ inches}$$

The wheel base length of a Cadillac automobile, for example, is about 11 feet and its tire rolling radius (R) is about 14.1 inches. The ramp height ($h$) at about 11 feet from the vertical center line between rolls 30 and 31 should thus be about 6⅝ inches. (Most U.S. automobiles have a wheel base length of about 9 feet 8 inches and a tire rolling radius of about 11.1 inches.) The second ramp portion 153 is preferably a mirror image of the third ramp portion 154, that is, its height increases from its end adjacent ramp portion 154 to its end adjacent ramp portion 152 according to the aforestated relationship for $h$.

From the foregoing detailed description of a preferred exemplary embodiment of the portable vehicle dynamic testing rig, according to the present invention, it can be seen that the foregoing objects and desired advantages in a testing rig have been obtained by the within invention. The testing rig is easily transported between different locations of use and is quickly and easily placed in use and particularly, is easily adjusted for simulating different masses of vehicles in the power absorption unit correlated to the mass of the vehicle being tested. One or two inertia wheels, permanently mounted to the power absorption unit, are easily and selectably connected to the roll means of the testing rig for selectably simulating a plurality of vehicle masses in the absorption unit without the need for removing and interchanging inertia wheels by the simple manipulation of an otherwise conventional transmission means and associated gear box. Very large and very small vehicles may thus be successively tested on the testing rig with a minimum of required adjustment of the rig to accommodate such vehicles and simulate accelerating and decelerating loads on the vehicle engine, as particularly required in testing vehicle engines for their compliance with smog control or vehicle exhaust emission standards.

The drag effect of a vehicle passing through the atmospheric air while driving on the highways is effected by the disclosed vane means without the need for additional brake means or the encumbent requirement for a water operated heat dissipation means normally employed with such brake means. The so-called "wind effect" upon any given vehicle may be easily adjusted through use of the disclosed damper means provided in association with the scroll provided about the inertia wheel mounted vane means. Further, in testing different size vehicles and simulating the different vehicle masses and wind effects encountered thereby during normal driving, the ramp means provided within the present invention cooperates with the testing rig roll means in maintaining such different size and mass vehicles in a generally horizontal disposition relative to the testing rig.

Having thus described an exemplary embodiment of the portable vehicle dynamic testing rig, according to the present invention, it should be understood by those skilled in the art that various modifications, adaptations and alterations of the exemplary testing rig may be made which come within the scope of the present invention which is defined and limited only by the following claims.

We claim:

1. A portable vehicle dynamic testing rig including a mobile main frame, spaced roll means and roll mounting means for mounting said roll means to said main frame for receiving and cradling thereon the driven wheels of a motor vehicle to be tested wherein the improvement comprises:
   a power absorption unit mounted upon said mobile main frame and including at least one inertia wheel;
   transmission means mounted on said mobile main frame and connected between said roll means and said inertia wheel for selectably connecting and producing two or more speed ratios between the rates of rotation of said inertia wheel and said roll means;
   torque transmitting means for transmitting relative torque of one of said pair of spaced roll means to a drive shaft associated with said transmission means to drive said transmission means and associated inertia wheel;
   a second inertia wheel provided on said drive shaft to be driven by said torque transmitting means when said one of said pair of spaced roll means is driven by said vehicle driven wheels;
   wherein said transmission means includes a gear box and associated gear shifting means for selectively connecting and disconnecting said one inertia wheel of said power absorption unit from said drive shaft; and
   said second inertia wheel is provided with a plurality of laterally extending vanes mounted about said second inertia wheel generally adjacent its periphery for moving adjacent air and thereby absorbing power from said vehicle during rotation of said second inertia wheel in response to the speed of rotation of said vehicle driven wheels.

2. The vehicle dynamic testing rig of claim 1 wherein:
   a scroll-like casing means is provided about said second inertia wheel with an inlet and outlet for driving air therethrough by said vanes; and
   damper valve means are provided in association with said casing means for selectably controlling the amount of air being circulated through said casing and the amount of power being absorbed from said vehicle driven wheels due to movement of air by said vanes.

3. A vehicles dynamic testing rig including a main frame, spaced roll means and roll mounting means for mounting said roll means to said main frame for receiving and cradling thereon the driven wheels of a motor vehicle to be tested wherein the improvement comprises:
   a power absorption unit mounted upon said main frame and including at least one inertia wheel;
   transmission means connected between said roll means and said inertia wheel for selectively connecting and producing two or more speed ratios between the rates of rotation of said inertia wheel and said roll means;
   said main frame is provided with connector means at at least three spaced locations thereon for releasably fastening said frame to means for lifting said frame; and
   said means for lifting said frame comprises a trailer means with at least two spaced vehicles transporting wheels thereon, a trailer frame and a hoist means associated with said trailer frame for hoisting said main frame up under said trailer frame by two of said connector means preparatory to transporting said rig by said wheels.

4. The vehicle dynamic testing rig of claim 3 wherein:
   said trailer means also includes a tongue member extending outwardly from said trailer frame to be connected to a vehicle to pull said trailer means and a third connector means on said trailer frame is releasably connected to said tongue member during transportation of said rig.

5. A vehicle dynamic testing rig including a main frame, spaced roll means and roll mounting means for mounting said roll means to said main frame for receiving and cradling thereon the driven wheels of a motor vehicle to be tested wherein the improvement comprises:
   a power absorption unit mounted upon said main frame and including at least one inertia wheel;
   transmission means connected between said roll means and said inertia wheel for selectably connecting and producing two or more speed ratios between the rates of rotation of said inertia wheel and said roll means; and
   wherein ramp means are provided for driving a motor vehicle onto or off of said rig transversely of said roll means and for positioning said vehicle in a generally horizontal disposition when on said rig and said roll means includes a pair of axially spaced rolls, said ramp means comprising:
   ramp portions having top surfaces extending generally from the level of a top surface of the test rig frame down to ground level wherein at least one portion of said ramp portions has a top surface having a height above the ground level on which the test rig is located which varies in accordance with the relationsip $$h = \sqrt{\left(R + \frac{d}{2}\right)^2 - \left(\frac{S}{2}\right)^2} + b - R$$

wherein $h$ equals the height of the ramp portion top surface above ground level; $R$ equals the vehicle driven wheels rolling radius; $d$ equals the diameter of the rolls of the roll means; $S$ equals the spacing of the axes of the rolls; and $b$ equals the height of the roll axes above ground level.

6. A vehicle dynamic testing rig including a main frame, a pair of spaced roll means and roll mounting means for mounting said pair of roll means to said frame for receiving and cradling the driven wheels of a motor vehicle to be tested wherein the improvement compirses:
   a first drive shaft rotatably mounted to said frame;
   an inertia wheel fixedly mounted to said first drive shaft;
   torque transmitting means for transmitting torque applied by the vehicle driven wheels on said roll means to said first drive shaft; and
   vane means on said inertia wheel for driving air adjacent said inertia wheel and thereby absorbing energy imparted by said vehicle driven wheels to said roll means in proportion to the speed of rotation of said vehicle driven wheels,
   said inertia wheel having a large moment of inertia compared to the other rotating elements of the within improvement.

7. The vehicle dynamic testing rig of claim 6 wherein:
   another inertia wheel is rotatably mounted to said frame by a second drive shaft; and
   transmission means are provided on said frame for selectively connecting or disconnecting said second drive shaft and its associated inertia wheel to said first drive shaft and its associated inertia wheel.

8. The vehicle dynamic testing rig of claim 7 wherein:
   said transmission means includes a gear box means with internal gears and a gear selector means for selectively connecting said second drive shaft to said first drive shaft through selectable internal gear relations for producing two or more speed ratios of the second drive shaft speed of rotation to the first drive shaft speed of rotation when driven by said roll means.

9. A portable vehicle dynamic testing rig including a portable main frame, a pair of spaced roll means and roll mounting means for mounting said pair of roll means to said frame for receiving and cradling the driven wheels of a motor vehicle to be tested wherein the improvement comprises:
- a power absorption unit mounted on said main frame and including at least one inertia wheel rotatably mounted therein on an inertia wheel main shaft;
- a drive shaft mounted to said main frame and torque transmitting means connecting one of said pair of spaced roll means to said drive shaft for rotating said drive shaft in direct response to the rotation of the driven wheels of the vehicle being tested; and
- transmission means including a gear box means for selectively connecting said inertia wheel main shaft to said drive shaft in two or more selectable speed ratios of said inertia wheel main shaft speed of rotation to said drive shaft speed of rotation.

10. A portable rig for dynamic testing of motor driven vehicles including a main frame, a pair of spaced roll means and roll mounting means for rotatably mounting said roll means to said main frame for receiving and cradling the driven wheels of a motor vehicle to be tested wherein the improvement comprises:
- at least three connector means at three spaced locations on said main frame;
- an auxiliary frame with a pair of spaced vehicle wheels rotatably mounted thereon;
- a hoist means on said auxiliary frame for hoisting said main frame up under said auxiliary frame by two of said frame connector means; and
- a tongue member extending outwardly of said auxiliary frame and including fastening means on an outer extremity thereof for releasably securing a third connector means on said frame thereto prior to hoisting said main frame up under said auxiliary frame.

11. A ramp means for use with a vehicle dynamic testing rig having spaced roll means mounted to a main frame to receive and cradle the driven wheels of a motor vehicle to be tested wherein the improvement comprises:
- ramp portions having top surfaces extending generally from the level of a top surface of the test rig frame down to ground level wherein at least one portion of said ramp portions has a top surface having a height above the ground level on which the test rig is located which varies in accordance with the relationship $$h = \sqrt{\left(R+\frac{d}{2}\right)^2 - \left(\frac{S}{2}\right)^2} + b - R$$

wherein $h$ equals the height of the ramp portion top surface above ground level; $R$ equals the vehicle driven wheels rolling radius; $d$ equals the diameter of the rolls of the roll means; $S$ equals the spacing of the axes of the rolls; and $b$ equals the height of the roll axes above ground level.

References Cited
UNITED STATES PATENTS

| | | | |
|---|---|---|---|
| 750,749 | 1/1904 | Brush | 73—117 |
| 2,311,684 | 2/1943 | Okamura et al. | 73—134 |
| 3,277,702 | 10/1966 | Brenneke | 73—117 |
| 3,289,471 | 12/1966 | Maxwell | 73—117 |

JERRY W. MYRACLE, Primary Examiner

U.S. Cl. X.R.

73—134